(12) United States Patent  
Gonnsen

(10) Patent No.: US 8,793,963 B2  
(45) Date of Patent: Aug. 5, 2014

(54) METHOD FOR LAYING A FLOOR COVERING IN A CABIN OF A VEHICLE

(75) Inventor: Johannes Gonnsen, Hamburg (DE)

(73) Assignee: Airbus Operations GmbH (DE)

( * ) Notice: Subject to any disclaimer, the term of this patent is extended or adjusted under 35 U.S.C. 154(b) by 299 days.

(21) Appl. No.: 13/130,849

(22) PCT Filed: Nov. 24, 2009

(86) PCT No.: PCT/EP2009/065732  
§ 371 (c)(1),  
(2), (4) Date: Jun. 9, 2011

(87) PCT Pub. No.: WO2010/058027  
PCT Pub. Date: May 27, 2010

(65) Prior Publication Data  
US 2011/0226901 A1   Sep. 22, 2011

Related U.S. Application Data

(60) Provisional application No. 61/200,063, filed on Nov. 24, 2008.

(30) Foreign Application Priority Data

Nov. 24, 2008   (DE) .......................... 10 2008 058 751

(51) Int. Cl.  
*E04B 1/00* (2006.01)  
*A47G 27/04* (2006.01)  
*B64C 1/00* (2006.01)  
*B29C 65/00* (2006.01)

(52) U.S. Cl.  
USPC .............. 52/746.1; 244/117 R; 156/60; 7/103

(58) Field of Classification Search  
USPC ............ 52/746.1; 7/103; 294/8.6; 296/97.23; 156/248  
See application file for complete search history.

(56) References Cited

U.S. PATENT DOCUMENTS

| 3,696,461 | A |   | 10/1972 | Kelly |
|---|---|---|---|---|
| 3,711,349 | A | * | 1/1973 | Snyder et al. ................. 156/157 |
| 3,938,764 | A | * | 2/1976 | McIntyre et al. ......... 244/117 R |
| 4,573,298 | A | * | 3/1986 | Harkins ....................... 52/404.3 |
| 4,797,170 | A | * | 1/1989 | Hoopengardner .............. 156/71 |

(Continued)

FOREIGN PATENT DOCUMENTS

| DE | 8226915 U1 | 5/1983 |
|---|---|---|
| DE | 202005020097 U1 | 5/2007 |

(Continued)

*Primary Examiner* — Ryan Kwiecinski  
(74) *Attorney, Agent, or Firm* — Lerner, David, Littenberg, Krumholz & Mentlik, LLP

(57) ABSTRACT

A method for laying a floor covering onto a floor in a cabin of a vehicle comprises the steps of applying a connection means to an element of a group comprising the floor covering and a floor, compacting the floor covering into a compact unit having an open end, bringing the floor covering into the cabin, pulling the open end of the floor covering along a length of the cabin beneath seats disposed in the cabin on the cabin floor and connecting the floor covering to the cabin floor using the connection means. The connection is made by way of one or more adhesive layers, for example. In this way, a carpet floor can be laid or replaced in a cabin of a vehicle without having to remove the seats located in the cabin.

11 Claims, 10 Drawing Sheets

(56) References Cited

U.S. PATENT DOCUMENTS

| | | | |
|---|---|---|---|
| 4,849,267 A * | 7/1989 | Ward et al. | 428/41.3 |
| 5,152,572 A * | 10/1992 | Ellis | 296/97.23 |
| 5,387,308 A * | 2/1995 | Heavrin | 156/763 |
| 5,484,639 A * | 1/1996 | Woodall et al. | 428/95 |
| 5,804,273 A * | 9/1998 | Drake et al. | 428/86 |
| 6,189,279 B1 * | 2/2001 | Fiechtl | 52/403.1 |
| 6,302,358 B1 * | 10/2001 | Emsters et al. | 244/137.1 |
| 7,108,910 B1 * | 9/2006 | Smith et al. | 428/354 |
| 7,185,473 B2 * | 3/2007 | Pacione | 52/747.11 |
| 7,384,498 B2 * | 6/2008 | Rannikko | 156/701 |
| 7,677,624 B1 * | 3/2010 | Koski et al. | 296/1.07 |
| 7,775,477 B2 * | 8/2010 | Wood | 244/118.1 |
| 2004/0121089 A1 * | 6/2004 | Whiting | 428/15 |
| 2005/0155700 A1 * | 7/2005 | O'Connor | 156/247 |
| 2007/0137777 A1 * | 6/2007 | Kalwara | 156/247 |
| 2007/0218238 A1 * | 9/2007 | Greer | 428/42.1 |
| 2007/0227090 A1 * | 10/2007 | Plante | 52/506.01 |
| 2011/0107720 A1 * | 5/2011 | Oakey et al. | 52/746.1 |

FOREIGN PATENT DOCUMENTS

| | | |
|---|---|---|
| FR | 2376016 A1 | 7/1978 |
| FR | 2715615 A1 | 8/1995 |
| WO | 90/01411 A1 | 2/1990 |

\* cited by examiner

METHOD FOR LAYING A FLOOR COVERING IN A CABIN OF A VEHICLE

CROSS-REFERENCE TO RELATED APPLICATIONS

This application is a national phase entry under 35 U.S.C. §371 of International Application No. PCT/EP2009/065732, filed Nov. 24, 2009, published in German, which claims the benefit of the filing date of U.S. Provisional Patent Application No. 61/200,063, filed Nov. 24, 2008, and of the German Patent Application No. 10 2008 058 751.6, filed Nov. 24, 2008, the entire disclosures of which are hereby incorporated herein by reference.

TECHNICAL FIELD

The invention relates to a method for laying a floor covering in a cabin of a vehicle. Furthermore, the invention relates to a floor covering for the cabin of a vehicle.

BACKGROUND TO THE INVENTION

A cabin of a vehicle usually comprises a row of seats on which seats passengers can be seated. To improve the well-being of passengers and to contribute to a visually pleasing appearance of the cabin, usually an attractive floor covering is also installed on the cabin floor, which floor covering is laid at the time of the fitting out of the interior of the vehicle, prior to installation of the passenger seats. In vehicles with considerable passenger traffic, as is regularly the case in commercial aircraft, the floor covering is subjected to mechanical wear and to soiling, and consequently it is usually replaced at certain time intervals.

In the state of the art this requires removal of the passenger seats from the cabin so that the floor covering is readily accessible and can be exchanged. In particular in the case of larger vehicles this preparatory measure is very time-consuming and costly. At present there is no known option as to how to replace the floor covering of a vehicle without deinstalling the passenger seats installed in the cabin.

SUMMARY OF THE INVENTION

It may thus be an object of the invention to propose a method that makes it possible to lay or exchange a floor covering of a vehicle, without for this purpose having to deinstall the passenger seats situated in the cabin. It may be a further object of the invention to propose a suitable floor covering that is easy to lay or exchange without this requiring deinstallation of the passenger seats situated in the cabin.

According to a first aspect of the invention, at first at least one connecting means is affixed to at least one element selected from a group comprising a floor and the floor covering. The floor covering is subsequently made to form a compact unit (is "compacted"), wherein at least one end of the floor covering should be exposed. The compacted floor covering is subsequently placed in the cabin of the vehicle and laid onto the floor. Since the method relates in particular to laying a floor covering in regions of a cabin floor on which installations, for example passenger seats, are arranged, the compact unit of the floor covering should, for example, be arranged in front of a frontmost passenger seat in the direction of extension or, for example, behind a rearmost passenger seat. The exposed end of the floor covering is then pulled along a direction of extension of the cabin, underneath the installations, on the cabin floor, and subsequently, while fully spread on the desired region of the floor, is connected to the cabin floor with the use of the connecting means.

This inevitably also means that the floor covering must be of a width that makes it possible to pull it underneath installations from one region of a cabin or of a cabin section to another, spaced-apart, region along the cabin floor. In the case of passenger seats as installations, the two regions concerned would be longitudinally spaced apart from each other. However, installations may also exist which require or suggest laying in lateral direction. Passenger seats in a cabin of a commercial aircraft are often implemented in the form of groups of seats, each group comprising two, three or four interconnected seats. These groups of seats can be affixed in rails by means of two or more legs, frames or the like, which rails extend along the floor. For example, two or more passenger seats can be affixed by means of only two pairs of legs in such floor rails, whereas in other embodiments further legs may also be provided between these pairs of legs, which make it possible to attach the group of passenger seats so that it is adequately secure. Consequently, underneath such groups of seats relatively wide spaces may be bridged, in which spaces the floor covering is then pulled along the cabin floor. If the compacted floor covering is laid in front of a frontmost seat or a frontmost group of seats, said floor covering can be pulled "rearwards" when viewed in the direction of travel or in the direction of flight, preferably to behind a last group of seats or vice versa. If underneath the installations there are several obstacles, for example in the form of legs, frames or the like, the floor covering may comprise a corresponding slit arrangement that facilitates passing through, without there being a need to pass several individual floor coverings through.

Particularly preferably, for the purpose of pulling the floor covering, pulling means are used which depending on their design are, for example, attached to the floor covering itself and can relatively easily be pulled underneath the seats or, for example, inserted through, thrown through or the like. With the use of the pulling means, from a position behind or in front of a seat or other installations, the floor covering can very easily be brought to the desired position, because for guiding the floor covering through from a position beside the passenger seats the gradual pulling-through underneath a group of seats is relatively cumbersome.

Compacting the floor covering may, for example, involve rolling, folding, consolidation or the like. Compacting aims to create a compact unit which can easily be transported, if possible by only one person, and which can then be placed in the restricted available space in front of or behind a seat. Particularly preferably the floor covering is rolled up. When the rolled-up floor covering is pulled under the passenger seats, a rod, a retainer or the like may be used so that the floor covering unrolls during the pulling movement, while at the same time the compact unit is not pulled underneath a seat where it may possibly jam.

In a further advantageous embodiment of the present invention the connecting means is attached to the floor covering, and the pulling means are attached to the connecting means. Consequently it is not necessary to integrate corresponding devices such as holes, eyelets or hooks in the floor covering, to which devices pulling means can be attached.

Likewise it may also be preferred to attach pulling means to the floor covering itself. To this effect several attachment variants may be considered. Particularly advantageous would be the integration of loops at the end of the floor covering, into which loops corresponding pulling means may be hooked or knotted. After the floor covering has been pulled through, the loops may be removed with the use of a tool, for example a carpet knife or the like. If the floor covering is a carpet or a similar textile floor covering, pulling means may also be affixed by a type of hook and loop fastener at the top of the floor covering, and after the floor covering has been pulled through may be removed again very easily. As an alternative to this, it would also be possible to use clamping devices, for example springless fabric clamps, as known from suspenders or braces, or the like.

In a preferred improvement of the method according to the invention, affixing at least one connecting means involves applying at least one adhesive layer, covered by a protective layer. If a conventional adhesive layer were to be affixed to the underside of the floor covering or to the floor of the cabin, due to the always occurring adhesive effect of the adhesive layer it would be possible only with difficulty to pull the complete floor covering along the cabin floor. Furthermore, the protective layer is also used to protect the adhesive layer from dirt build-up. If the connecting means is to be applied to the floor covering, the protective layer may significantly facilitate compacting of the floor covering.

Accordingly, connecting the floor covering by way of the connecting means also involves removing the protective layer. In a particularly preferred variant of the method according to the invention this is achieved in that the protective layer is pulled off against the previous pulling direction of the floor covering. The exposed end of the compacted floor covering is, for example, pulled over the entire cabin length of the vehicle and is situated at a starting point for bonding, at which starting point it is aligned by means of boundary edges of the floor covering and of the cabin floor before it is connected, gradually or in a flowing movement, to the cabin floor. For bonding, the protective layer is pulled off and the floor covering is gradually pressed against the floor, if necessary following prior correction of its position.

On the other hand, to avoid the need for two different working positions it might also be sensible to pull the protective layer from the adhesive layer in the same direction as the previous direction of pulling.

Pulling off the protective layer preferably takes place by means of a pulling means that is arranged on the protective layer and that essentially extends between the floor covering and the cabin floor. When preparing the floor covering or the floor, in particular during or after applying the adhesive layer to the floor covering and/or to the floor, corresponding pulling means may be affixed to the protective layer of the adhesive layer. The pulling means may be compacted together with the floor covering, provided the adhesive layers are affixed to the floor covering before said floor covering is laid. As an alternative to this, in the case of affixation of the adhesive strips to the floor prior to laying, said pulling means would already be in a position suitable for pulling off. After the floor covering has been pulled through, finally pulling off the protective layer can take place by way of the pulling means.

For the sake of simplicity the adhesive layer may be designed as a double-sided adhesive tape that may be bonded to the floor covering or the floor. In the case of the floor covering, application may take place to a spread-out floor covering or a floor covering extending between two rollers or some other device. If such an adhesive tape were to be bonded to the floor, it would be imaginable to pull the adhesive tape first underneath the installations along the floor, and after this pulling movement to peel off, by way of pulling means, a protective layer facing the floor. After the adhesive tape has been pressed against the floor, pulling the floor covering through and subsequently bonding it into place would be possible.

The method according to the invention provides a particularly simple option of laying a floor covering in a cabin of a vehicle, which cabin comprises passenger seats, without, however, having to de-install said passenger seats. If aisles are provided within the cabin, which aisles do not comprise any passenger seats, in those areas floor coverings can be laid or exchanged with the use of conventional laying methods.

The invention furthermore also relates to a floor covering that comprises at least one adhesive layer that is covered by a protective layer which in turn comprises a pulling means as described above. The floor covering should be suitable for being laid by means of the method according to the invention. This means, in particular, that no stiff or rigid floor coverings are used, but preferably floor coverings that can be folded, consolidated, rolled up, or compacted in some other manner in order to be able to easily move them into the cabin and in the cabin unroll them or spread them in some other manner.

BRIEF DESCRIPTION OF THE FIGURES

Further characteristics, advantages and application options of the present invention result from the following description of the exemplary embodiments and of the figures. All the described and/or illustrated characteristics per se and in any combination form the subject of the invention, even irrespective of their composition in the individual claims or their interrelationships. Furthermore, identical or similar components in the figures have the same reference characters.

DETAILED DESCRIPTION OF EXEMPLARY EMBODIMENTS

Figure 1:
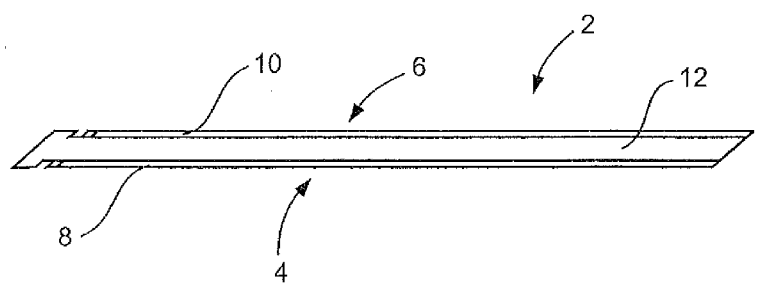
FIG. 1 shows a spread-out floor covering with affixed adhesive strips.

FIG. 1 shows a spread-out floor covering 2 which on two longitudinal sides 4 and 6 as an example comprises connecting means in the form of adhesive strips 8 and 10. In a spread-out state of the floor covering 2 the adhesive strips 8 and 10 can be affixed to the underside 12 of the floor covering in order to prepare the floor covering 2 for laying.

Figures 2A, 2B:
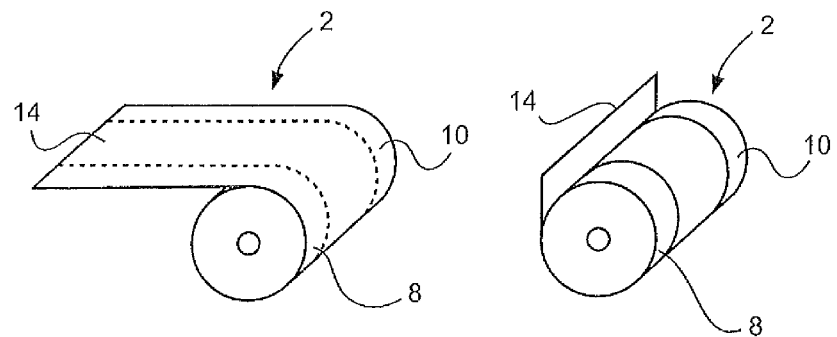
FIGS. 2a+b show a floor covering compacted to form a roll.

FIGS. 2a and 2b show that because of its flexibility the floor covering 2 together with the adhesive strips 8 and 10 can be rolled up ("compacted") to form a roll in order to be put in this way into the cabin of the vehicle. The floor covering 2 is to be compacted in such a manner that at least one end 14 of the floor covering 2 is exposed. This end 14 should be dimensioned in such a manner that it can be pulled through underneath installations affixed to the cabin floor and can permanently remain in that location. During compacting, on the one hand the adhesive strips 8 and 10 can be situated on the outside (FIG. 2a), on the other hand also on the inside (FIG. 2b). In the latter case the end 14 of the laid floor covering 2 has a tendency to press towards the floor so that the process of connecting to the floor is facilitated.

After the floor covering 2 has been delivered in its compacted form to the cabin of the vehicle, the floor covering can be pulled along the cabin floor. To ensure even unrolling or undoing of the floor covering 2 from its compacted form, in the exemplary presentation of FIG. 3 a rod is inserted as a roll holder in the rolled-up floor covering 2 so that the rolled-up region of the floor covering 2 does not slide and potentially jam underneath passenger seats. Pulling out the floor covering 2 can take place by means of pulling means 16 and 18 designed as pulling cables. The pulling means 16 and 18 are preferably arranged on protective layers 20 and 22 of the adhesive strips 8 and 10 so that no connection between the pulling means 16 and 18 and the floor covering 2 needs to be established in a mechanical manner or the like.

Figure 4:
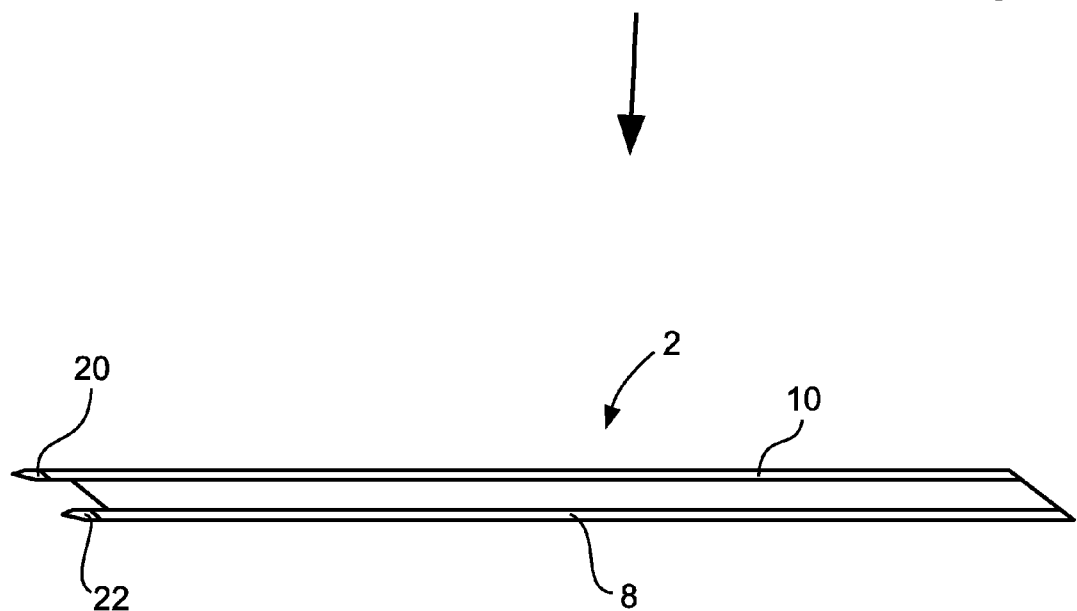
FIG. 4 shows a floor covering positioned on the cabin floor.

FIG. 4 shows a bottom view of the completely spread-out floor covering 2.

Figure 3:
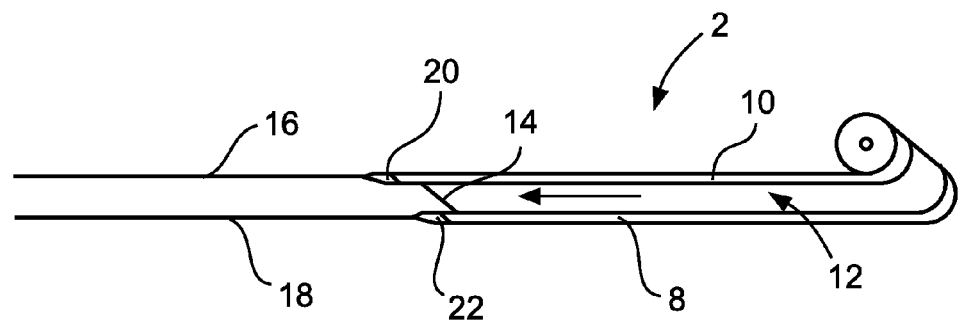
FIG. 3 shows a pulling process of the floor covering on the cabin floor.
Figure 5A:
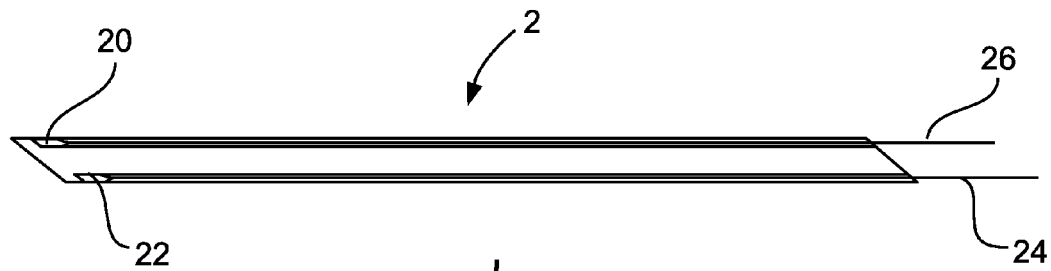
FIGS. 5a-d show a process of separating the protective layers.
Figure 5B:
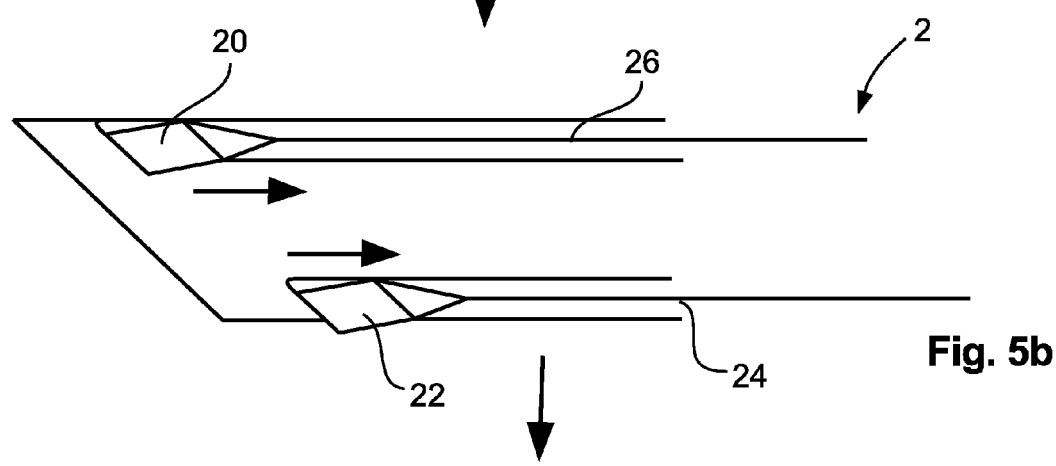
Figure 5C:
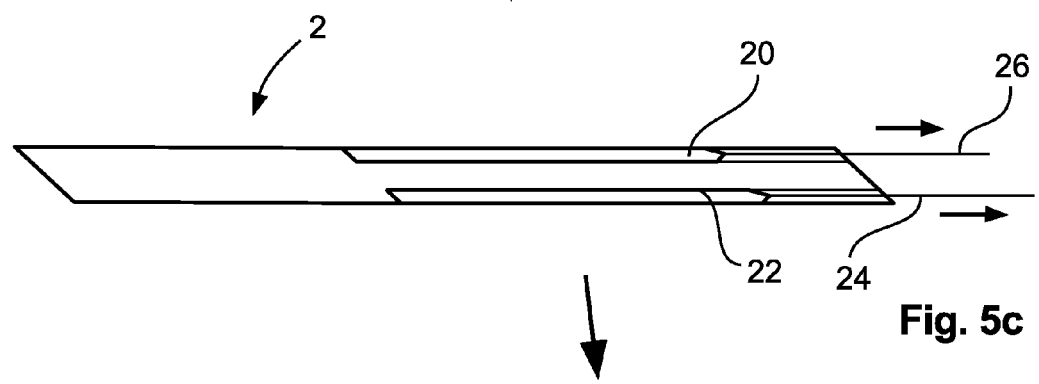
Figure 5D:
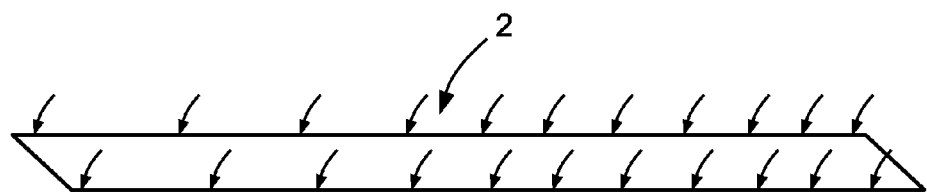

In order to detach the protective layers 20 and 22 from the adhesive strips 8 and 10 the protective layers 20 and 22 need to be pulled off, preferably in a direction opposite the direction of pulling shown in FIG. 3. In order to pull off the protective layers 20 and 22, additional pulling means 24 and 26 may be used, which may be affixed to the protective layers 20 and 22 already at the time of preparation of the floor covering 2 before being compacted together with the floor covering 2. FIGS. 5b–5d show the process of pulling off the protective layers 20 and 22 up to the exposed floor covering 2. Subsequent to pulling off the protective layer 20 and 22 pressing the floor covering 2 along the cabin can be carried out so that secure bonding is achieved, as indicated by the arrows in FIG. 5d.

Figure 6A:
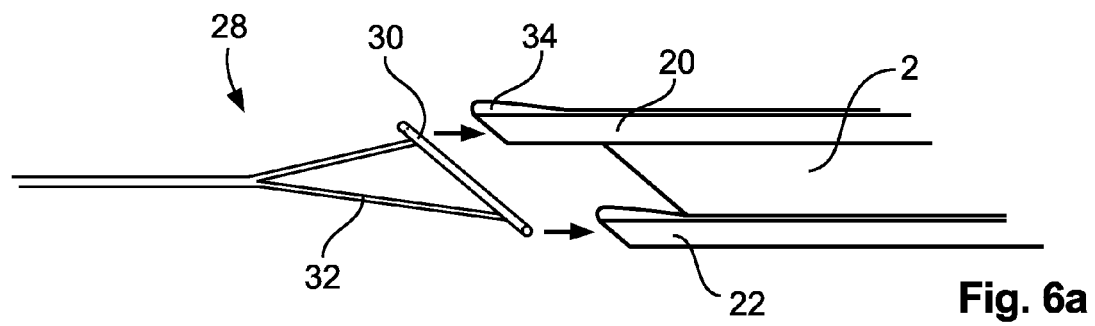
FIGS. 6a+b show modified pulling means.
Figure 6B:
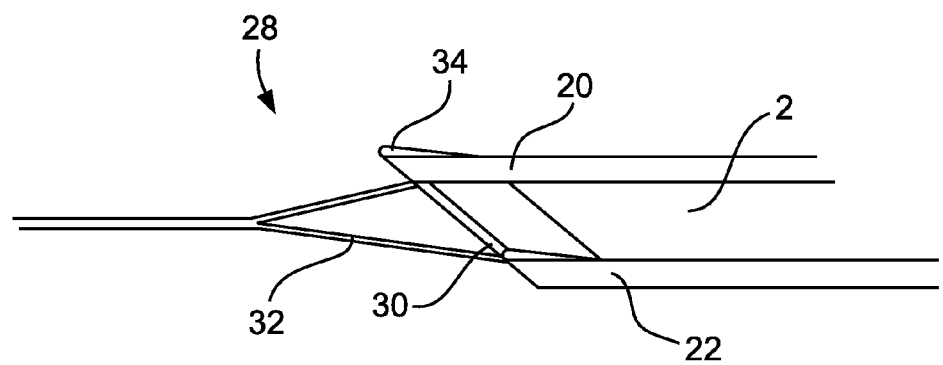

To pull the floor covering 2 along the floor, alternative pulling means 28 comprising a bar 30 and a triangle tape 32 can be used, wherein the bar 30 can, for example, engage strap-shaped folded-over ends 34 of the protective layers 20 and 22, as shown in FIGS. 6a and 6b. The protective layers 20 and 22 may extend in double length underneath the floor covering 2 so that adequate stability can be ensured.

Figure 7A:
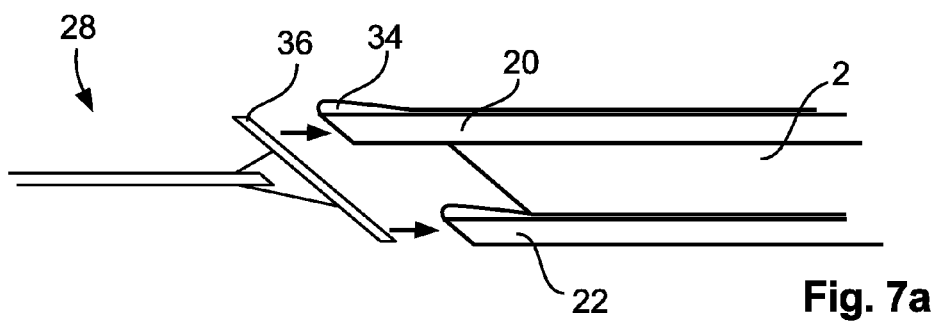
FIGS. 7a+b show further modified pulling means.
Figure 7B:
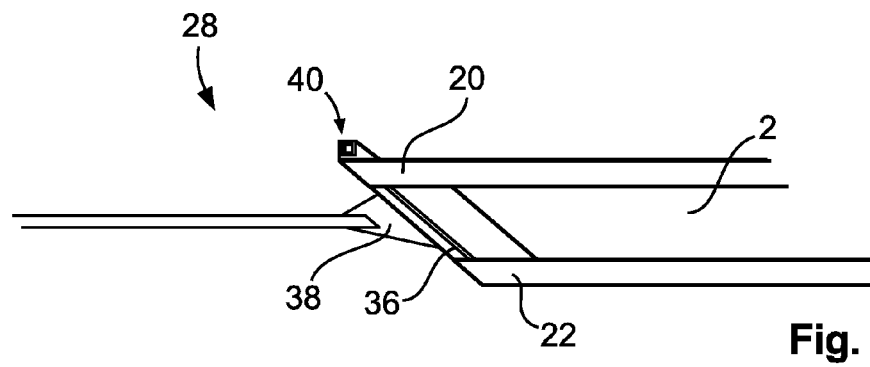

As an alternative to this it is also possible for a rectangular bar 36 to engage the ends 34 of the protective layers 20 and 22, as shown in FIG. 7a, wherein instead of a triangle tape 32 it is also possible to use a metal sheet 38. As shown in FIG. 7b, in each case a protruding end 40 of the protective layers 20 and 22 may be wrapped up with the bar 36.

Optionally, the bars 30 and 36 can also comprise slits to accommodate or to clamp into place the protective layers 20 and 22, or they can comprise suitable clamping devices, for example springless fabric clamps, as known from suspenders or braces, or the like.

Likewise optionally, retrieving a pulling means, and/or pulling-through the floor covering 2 may take place automatically by means of a spring mechanism in the manner of a tape measure. As an alternative to this it would also be possible to slide the pulling means along the floor with the use of a device in the manner of a tape measure that in its unrolled state can absorb a certain axial force.

Figure 8A:
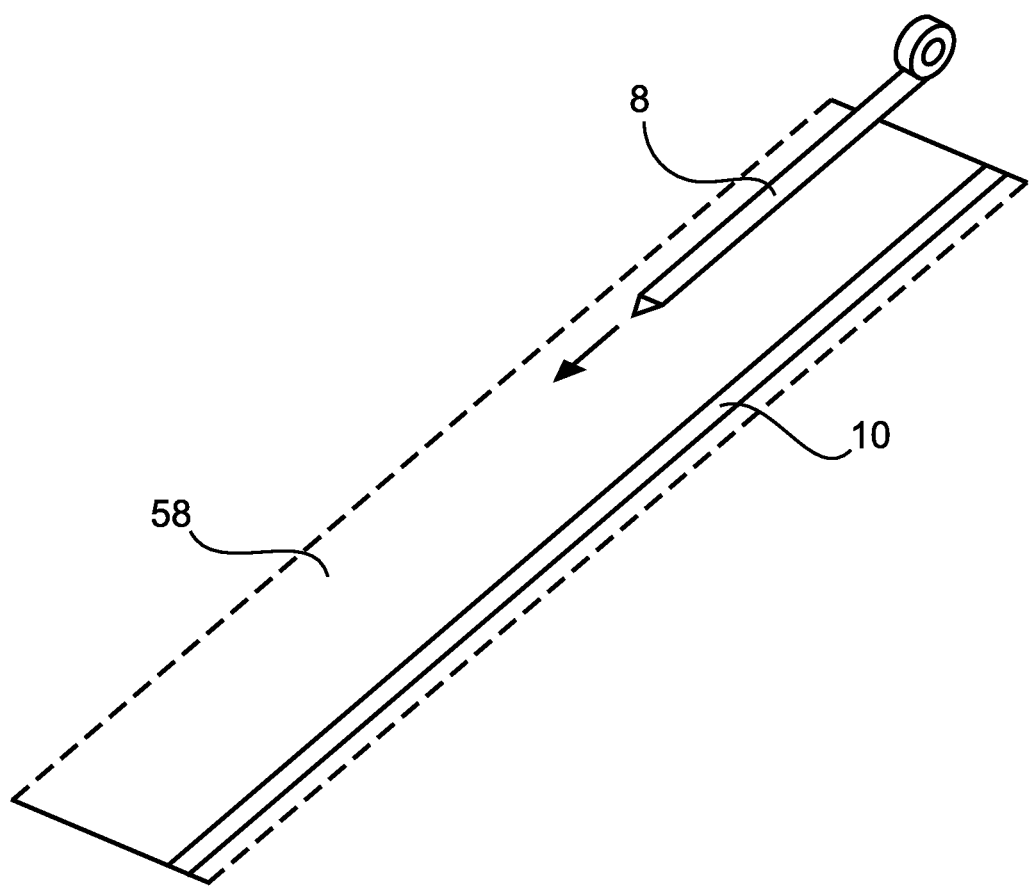
FIGS. 8a+8b show the affixation of connecting means to the cabin floor, as well as the process of removing protective layers.
Figure 8B:
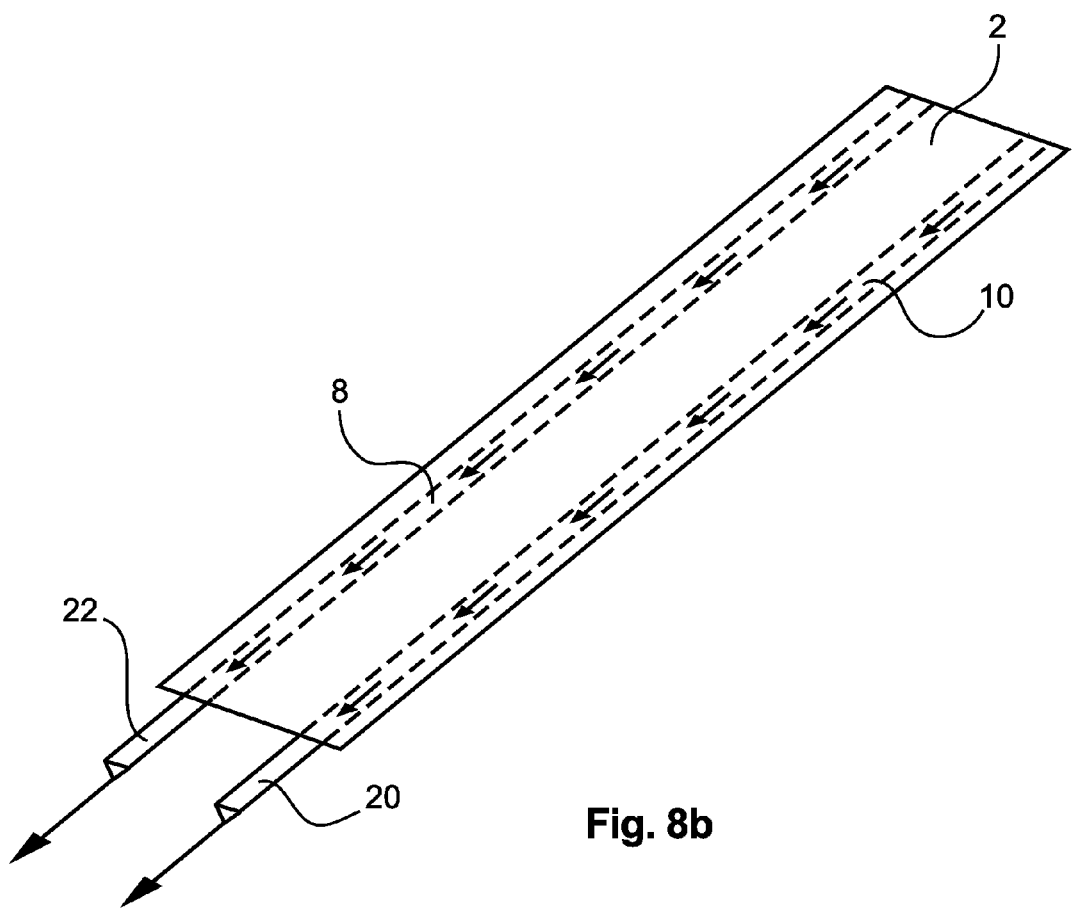

In an alternative embodiment according to FIGS. 8a and 8b, adhesive strips 8 and 10 may be arranged on a floor 58, for example by pulling with the use of pulling means or the like. After application of the floor covering 2, according to FIG. 8b the protective layers 20 and 22 can be removed from the adhesive strips 8 and 10 by pulling them off so that pressing the floor covering 2 onto the floor 58 and onto the adhesive strips 8 and 10 according to FIG. 5d can take place. It should be pointed out that at the same time in addition to affixing the adhesive strips 8 and 10 to the floor 2 it may also be possible to affix adhesive strips 8 and 10 to the floor 58.

Figure 9A:
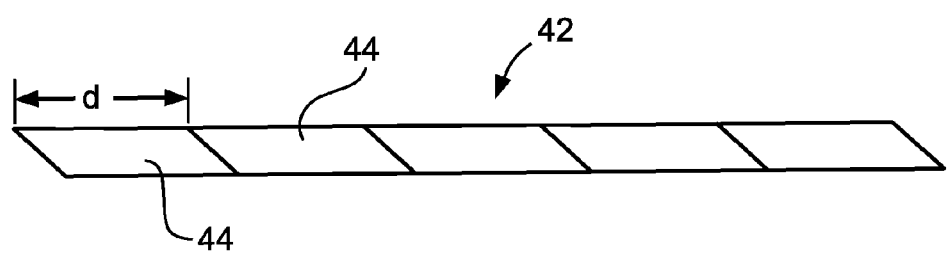
FIGS. 9a+b show the process of removing a floor covering.
Figure 9B:
Figure 9B:
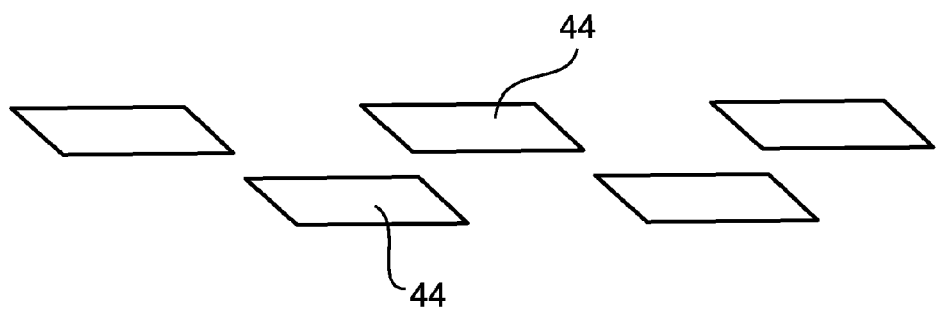

If, in addition, it is necessary to remove old floor coverings from the cabin underneath passenger seats, as shown in FIGS. 9a and 9b, incisions may be made at more or less regular spacing d in the floor covering 42 to be removed so that individual sections 44 form that are situated between the individual passenger seats and that can be pulled off in those locations.

As an alternative to the above, it would be possible to detach the floor covering 42 from the floor by undoing an edge of the floor covering and by pulling this edge over the remaining floor covering 42 glued into place, without prior incisions. This may advantageously also be implemented with the use of pulling means that may be affixed to the floor covering 42 by way of textile clamps or the like.

Figure 10:
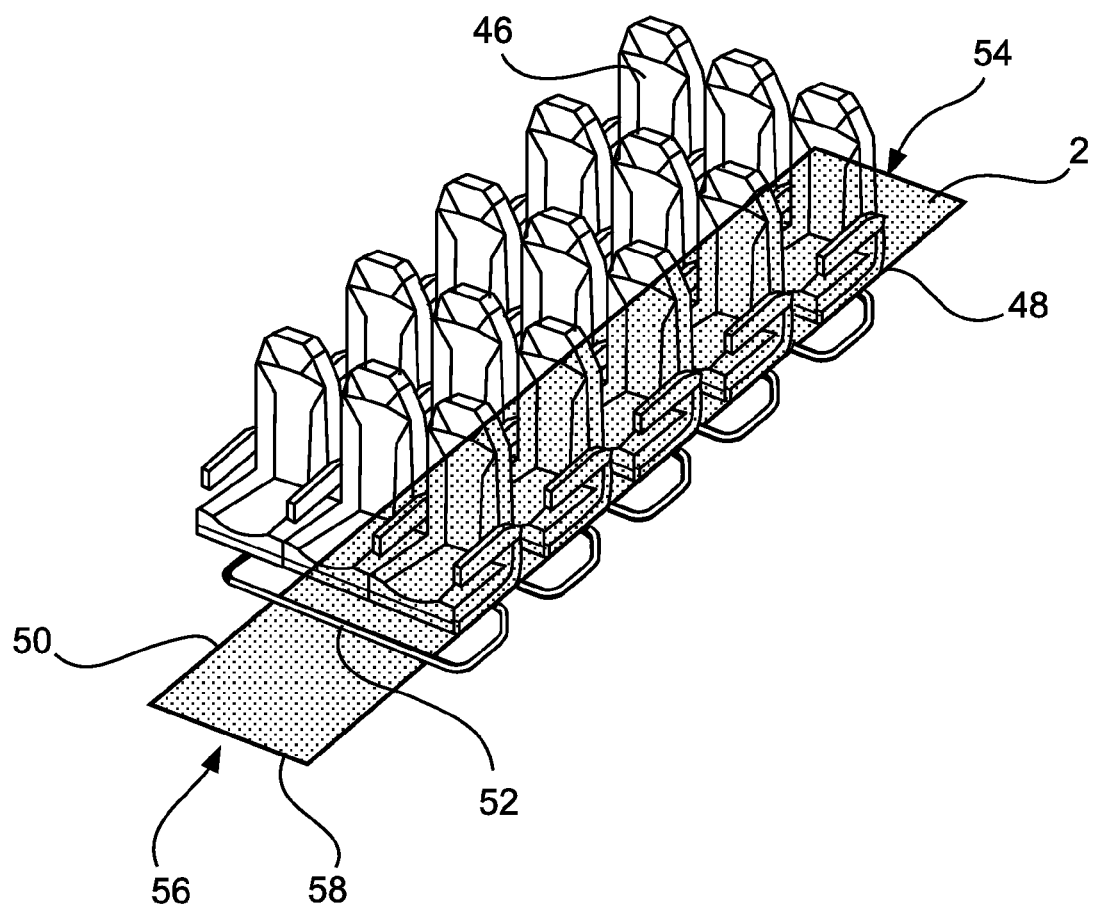
FIG. 10 shows a floor covering laid in a cabin.

Furthermore, FIG. 10 shows a section from a cabin of a vehicle, in which cabin several passenger seats 46 are arranged, underneath which passenger seats 46 the floor covering 2 is situated. Between seat rails 48 and 50, to which the passenger seats 46 are attached, underneath the passenger seats 46 there is an essentially free space which at regular spacing is interrupted by baggage bars 52 which prevent items of baggage from sliding forwards. By means of the method according to the invention, the floor covering 2 can be installed in this space delimited towards the top and towards the side, without the need for prior deinstallation of the passenger seats 46, because according to the invention the floor covering 2 is pulled through from a rear end 54 to a front end 56 (or vice versa) of a cabin floor 58 and is bonded to said cabin floor 58.

Figure 11:
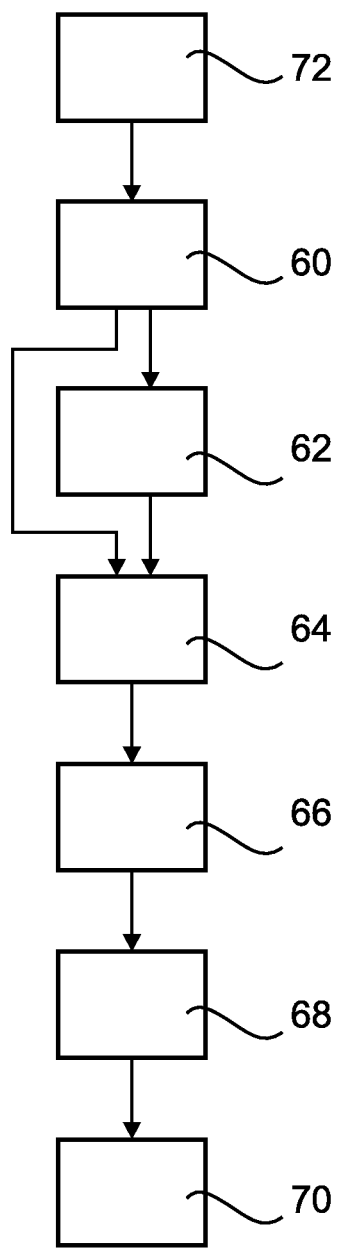
FIG. 11 shows a block diagram of the method.

Finally, FIG. 11 shows a block diagram of the method according to the invention, which method essentially comprises the following steps. After affixation 60 of at least one connecting means 8, 10 to a floor and/or to the floor covering 2, compaction 62 of the floor covering 2 to form at least one compact unit with a free end 12 of the floor covering 2, the compacted floor covering 2 is delivered 64 to the cabin of the aircraft and is laid 66 onto the floor. Subsequently, the exposed end 14 of the floor covering 2 is pulled 68 along an extension of the cabin underneath the installations on the cabin floor with the use of pulling means 16, 18, 24, 26, 28, and finally is connected 70, by means of the connecting means 8, 10, to the cabin floor. Compacting 62 can also take place in parallel to affixing the connecting means 8, 10 or it can take place at an earlier point in time.

In addition to the above, already prior to this the floor covering 2 that is already situated on the floor may be removed 72.

Furthermore, it is particularly advantageous to use strips of double-sided adhesive tape 8, 10, whose one side provides a stronger adhesive grip than does the other side. The stronger adhesive side is to be affixed to the floor covering 2 so that reliable separation of the floor covering from a floor in the cabin can take place without carpet residue remaining or without the floor being destroyed.

In addition, it should be pointed out that "comprising" does not exclude other elements or steps, and "a" or "one" does not exclude a plural number. Furthermore, it should be pointed out that characteristics or steps which have been described with reference to one of the above exemplary embodiments can also be used in combination with other characteristics or steps of other exemplary embodiments described above. Reference characters in the claims are not to be interpreted as limitations.

List of Reference Characters

2 Floor covering
4 Longitudinal side

6 Longitudinal side
8 Adhesive strip
10 Adhesive strip
12 Underside
14 End of the floor covering
16 Pulling means
18 Pulling means
20 Protective layer
22 Protective layer
24 Pulling means
26 Pulling means
28 Pulling means
30 Round bar
32 Triangle tape
34 End of a protective layer
36 Rectangular bar
38 Metal sheet
40 End of a protective layer
42 Floor covering to be removed
44 Sections of the floor covering to be removed
46 Passenger seat
48 Seat rail
50 Seat rail
52 Baggage bar
54 Rear end
56 Front end
58 Cabin floor
60 Affixing connecting means
62 Compacting
64 Delivering
66 Laying
68 Pulling
70 Connecting
72 Removing the floor covering

The invention claimed is:

1. A method for laying a floor covering underneath installations on a floor in a cabin of a vehicle, comprising:
affixing at least one connecting means comprising an adhesive layer covered by a protective layer to at least one element selected from a group consisting of the floor and the floor covering, wherein the affixing step includes applying the adhesive layer;
compacting the floor covering to form at least one compact unit, wherein at least one end of the floor covering is exposed;
delivering the floor covering to the cabin of the vehicle and laying the floor covering on the floor;
pulling the exposed end of the floor covering along an extension of the cabin underneath the installations on the floor using a first pulling means; and
connecting the floor covering to the cabin floor using the at least one connecting means;
wherein the connecting step includes removing the protective layer, along a direction parallel to the extension of the cabin, by a second separate pulling means affixed on the protective layer.

2. The method of claim 1, wherein the width of the floor covering matches the width of the installations.

3. The method of claim 1, wherein the at least one connecting means is attached to the floor covering and the second pulling means is attached to the at least one connecting means.

4. The method of claim 1, wherein the first pulling means is attached to the floor covering.

5. The method of claim 1, wherein the protective layer is pulled off against the previous pulling direction of the floor covering.

6. The method of claim 5, wherein the second pulling means substantially extends between the floor covering and the floor.

7. The method of claim 6, further comprising removing the protective layer arranged to the floor using the second pulling means.

8. The method of claim 1, wherein the adhesive layer is a double-sided adhesive tape.

9. The method of claim 1, further comprising pressing the floor covering and the at least one connecting means against the floor.

10. The method of claim 1, further comprising the following preparatory steps for removing a previously installed floor covering from the floor:
making incisions in the previously installed floor covering between installations arranged on the cabin floor to form individual sections; and
pulling off the sections.

11. The method of claim 1, further comprising a preparatory step for removing a previously installed floor covering from the floor including pulling the previously installed floor covering off using a third pulling means.

* * * * *